United States Patent [19]

Adams

[11] 4,070,292
[45] Jan. 24, 1978

[54] APPARATUS FOR TREATING SEWAGE

[75] Inventor: Leon R. Adams, Apache Junction, Ariz.

[73] Assignee: American Water Recycling Company, Apache Junction, Ariz.

[21] Appl. No.: 607,623

[22] Filed: Aug. 25, 1975

[51] Int. Cl.² ............................................. C02C 1/08
[52] U.S. Cl. ............................ 210/195 R; 210/206; 210/220
[58] Field of Search ................. 210/8, 14, 15, 3, 220, 210/221 R, 221 M, 195, 200–202, 206, 62, 64, 195 R, 196–197

[56] References Cited

U.S. PATENT DOCUMENTS

| | | | |
|---|---|---|---|
| 3,271,304 | 9/1966 | Valdespino et al. | 210/14 |
| 3,371,033 | 2/1968 | Simmons et al. | 210/14 |
| 3,408,295 | 10/1968 | Vaichulis | 210/62 |
| 3,764,011 | 10/1973 | Owens | 210/202 |
| 3,764,525 | 10/1973 | Goodman et al. | 210/15 |
| 3,834,536 | 9/1974 | Kelsey | 210/220 |
| 3,907,672 | 9/1975 | Milne | 210/202 |

Primary Examiner—Charles N. Hart
Assistant Examiner—Benoît Castel
Attorney, Agent, or Firm—Gregory J. Nelson

[57] ABSTRACT

An apparatus for treating sewage is disclosed. The apparatus includes a modular treating tank which is divided by a perforated baffle or screen into primary and mixing zones. The mixing zone has a curved or semi-spherical end wall. A mixing and aeration system utilizing a high efficiency ejector withdraws liquid from the mixing chamber and directs the recirculated flow toward the primary chamber across the perforated baffle. The effluent from the treating tank is subsequently chemically disinfected by timed, periodic addition of a chemical such as a selected halogen. A recirculating generally oval or circular flow pattern in which liquid is withdrawn from the mixing zone, aerated and directed toward the primary chamber is established. Complete mixing with the incoming sewage occurs in the primary chamber to maintain a uniform concentration of oxygen, feed and purifying organisms throughout the tank volume.

2 Claims, 5 Drawing Figures

APPARATUS FOR TREATING SEWAGE

This invention relates to an apparatus for treating sewage and more particularly relates to an advanced aerobic oxidation apparatus of the complete mix type in which a uniform concentration of disolved oxygen, feed and purifying organisms are maintained in the treating tank and which results in an effluent suitable for reuse.

It is well known in the prior art to treat sewage by the activated sludge process. This process consists essentially of the aeration of a mixture of settled sewage with bacteriologically active sludge to promote metabolic oxidation of the impurities. The effectiveness of treating processes is measured by the BOD (Biological Oxygen Demand) of the treated effluent and the quantity of suspended solids. In practicing the activated sludge method it is important to insure that the sludge and the mixture of sewage and sludge be kept in suspension by sufficient turbulence and adequate amounts of oxygen must be present. Air which supplies the required oxygen can be introduced into such systems in a number of ways. For example, aeration may be accomplished by means of air diffusers arranged in the bottom of the tank. Other means include the use of mechanical aerators such as turbine type devices which rotate in the tank to intermittently mix air with the sewage.

Conventionally, activated sludge treating processes also involve the separate steps of grit removal, primary sedementation or settling and aeration followed by final or secondary settling. The system effluent may also be treated on a filter and chemically disinfected. Periodically sludge from the system will be withdrawn from the settling or sedementation tank to a sludge digestion tank where aerobic or anaerobic digestion of the sludge will occur prior to disposal of the sludge. Generally the activated sludge process is carried out in a series of hydraulically interconnected tanks often circular in design.

The present invention provides a treatment system of the complete mix type in which the primary treatment steps all occur in a single tank of particularly efficient design. The present invention provides a simplified, effective and economical process and apparatus for the treatment of sewage. The terms "sewage" and "waste water" as used herein broadly means a variety of domestic and industrial wastes containing mineral and organic matter in various forms as well as bacteria, viruses and other living matter. The liquid separated from the tank is a clear effluent which can be treated by tertiary treatment in, for example, an effluent polishing pond and can be subsequently used for non-domestic uses such as irrigation. The design of the tank and the recirculation systems induces complete mixing of the incoming raw waste with the tank contents resulting in a more uniform oxygen demand with a lower demand rate than traditional activated sludge systems. Satisfactory treatment results can be obtained in reduced time and high solid concentrations can be maintained in suspension. Sludge is almost completely oxidized by the mechanism of engenuous respiration so that little or no sludge accumulates or must be withdrawn from the system for disposal.

Briefly, the present invention comprehends a unitary, horizontally disposed waste water treating tank or chamber which has at least the incoming end of the tank baffled or formed with semi-spherical head to induce a preestablished mixing pattern. A transverse foraminous baffle separates a primary chamber and a mixing chamber within the tank. Raw sewage is admitted into the primary chamber. An important feature of the invention resides in the mixing system which withdraws mixed liquor from the mixing chamber and mixes substantial volumes of air with the recirculated mixed liquor. The mixing system includes a venturi type ejector which entrains substantial volumes of air into the recirculated liquid. The aerated, mixed liquor is returned in the lower area of the mixing zone and directed toward the primary chamber giving a constant maximum mixing action. Recirculated liquid passes through the baffle and the incoming raw waste mixes completely and intimately with the microorganisms in the tank to place a more uniform load on the system. Substantial solids removal occurs in the primary chamber. Clear effluent is withdrawn from the tank subsequent to the mixing chamber and is introduced into a holding tank which may be separate or integral with the treatment tank. Disinfection by means of suitable chemical treatment occurs in the holding tank for sufficient contact time. Preferably disinfection takes place by periodic addition of a selected halogen such as chlorine or iodine. The resulting effluent is suitable for non-domestic uses.

The apparatus of the present invention is simple, efficient and easily constructed. Because of its design, the apparatus can be easily constructed in modular or "package" units and transported to the plant site for installation. Additionally, because of the simple and unique design of the present apparatus, the present invention can be adapted as a conversion to many existing septic tank applications to convert such septic tanks to extended aeration systems where conventional septic tanks are overloaded or are environmentally objectionable. The process of the present invention permits the maintenance of higher solids concentration in suspension; therefore higher loadings of BOD per unit of volume are possible. The process, in effect, reclaims the sewage discharging a clear effluent suitable for many non-domestic uses. Almost complete decomposition of solids occurs with little or no remaining settled solids or sludge.

The above and other objects and advantages of the present invention will become more apparent from a reading of the following specification, claims and drawings in which:

FIG. 4 is a cross-sectional view illustrating in detail the ejector used for recirculating the contents of the treatment tank.

Figure 1:
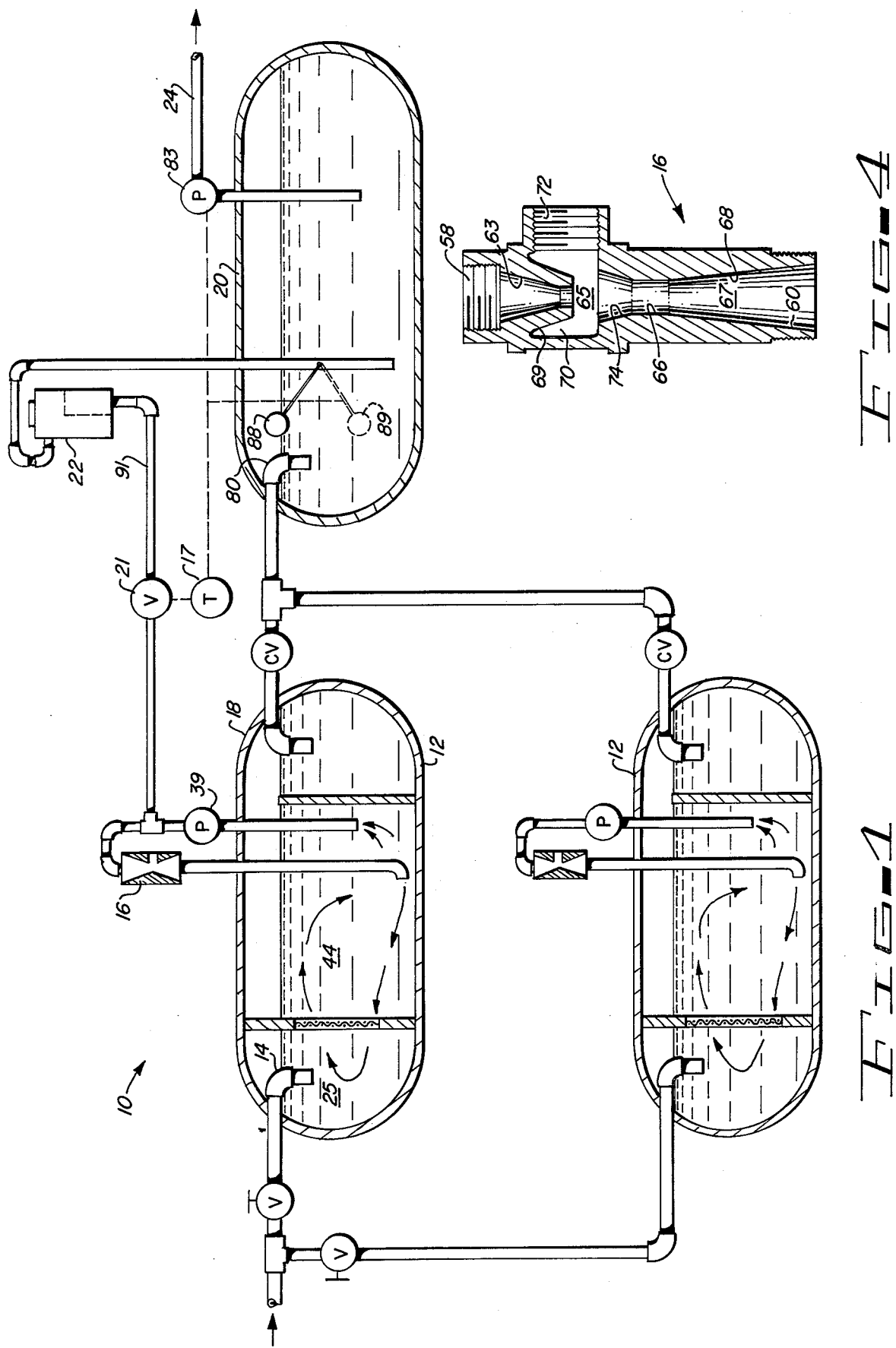
FIG. 1 is a schematic flow diagram showing the sewage treating system and apparatus of the present invention.

The improved extended aeration waste water treatment process of the present invention is carried out in a treatment apparatus generally designated by the numeral 10 and shown schematically in FIG. 1. FIG. 1 has been simplified in order to convey a fundamental understanding of the invention at the outset of this specification. Briefly, as seen in FIG. 1, the sewage treatment system of the present invention comprises one or more modular treating tanks 12. The number of treatment tanks 12 utilized in the system will depend upon the average quantity of sewage presented for disposal. Typically, for convenience of fabrication and transportation the treatment tanks will be prefabricated and will have a capacity of approximately 2000 gallons. Additional stand-by treating tanks may be included in the system in the event of mechanical difficulty with any of the components of the treatment tank on line.

Raw sewage enters the treatment tank 12 at influent pipe 14. The incoming raw sewage is completely mixed with a recirculated suspension of disolved oxygen feed and purifying organisms termed the "mixed liquor." Recirculation is accomplished by means of the pump 39 and ejector 16 which induces large quantities of air and mixes it with the recirculated liquid suspension. The recirculated liquid is introduced near the bottom of the treating tank. The aerated, recirculated suspension is directed toward the primary chamber 25. Substantial BOD and solids reduction occurs in the primary chamber.

Treated effluent is removed from the treating tank at discharge line 18 and is subsequently introduced into holding tank 20. The treatment in tank 12 results in removal of 90 to 95% of the solids. Short detention of the treated effluent, of approximately 6 to 12 hours, occurs in the holding tanks. Disinfection takes place in the holding tank by contact with a suitable disinfecting agent such as a selected halogen. The selected disinfectant is added by chemical feed unit 22. In the preferred embodiment the disinfectant is iodine and is dissolved and admitted into the holding tank 20 at preselected time intervals under the control of solenoid valve 21 and timer 17. The treated effluent is pumped from the tank by pump 83 at discharge line 24 and disposal of the final effluent can be by tertiary treatment in a suitable effluent polishing pond. Subsequently, the treated effluent is sufficiently purified to be used for non-domestic uses such as irrigation.

Figure 2:
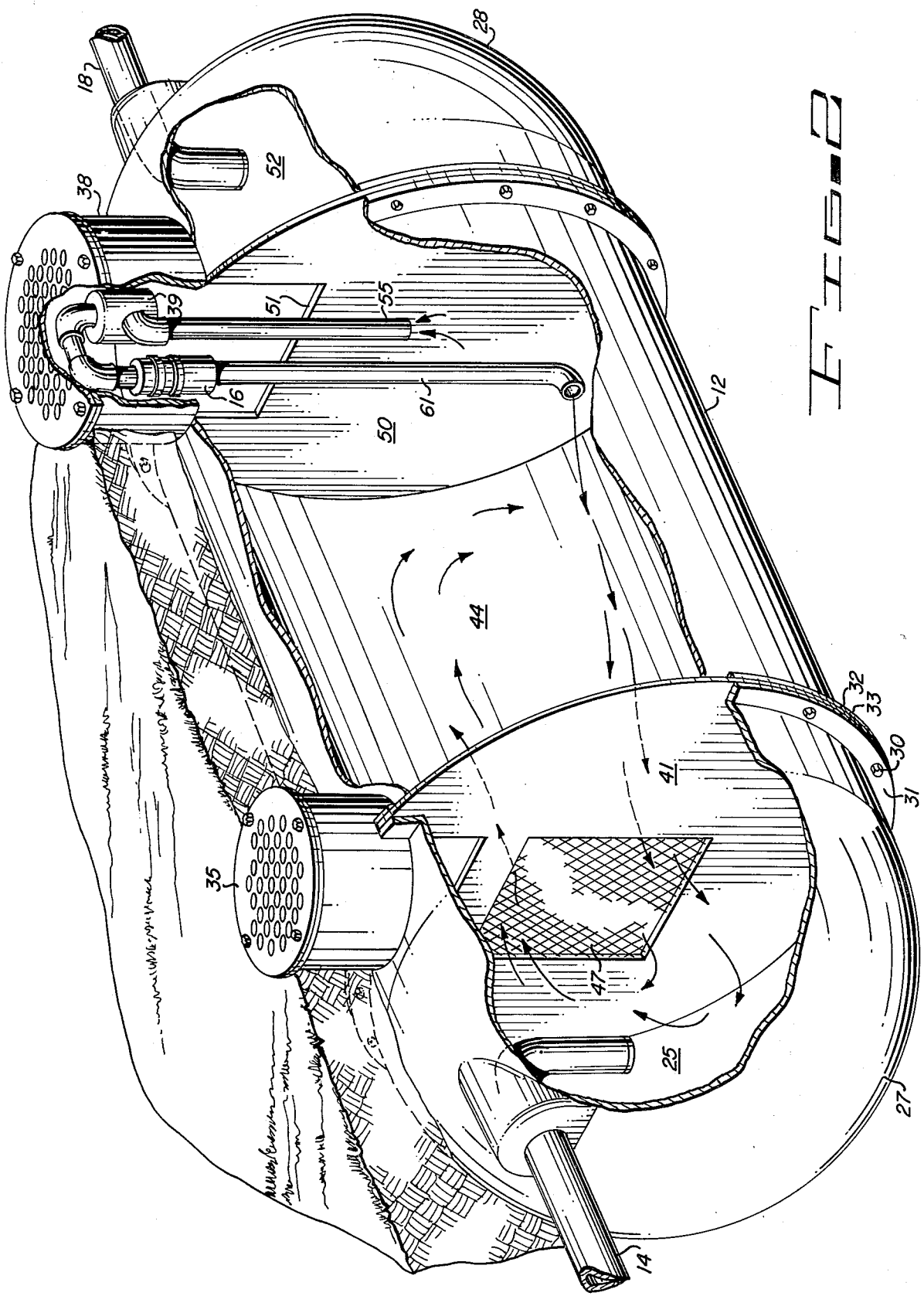
FIG. 2 is a perspective view, partially broken away, illustrating in detail the treatment tank used in carrying out the process of the present invention.

The details of the treating tank 12 are more clearly shown in FIG. 2. The treating tank 12 has a generally cylindrical body having oppositely disposed semi-spherical heads 27 and 28. Tank 12 is normally installed in a horizontally disposed position. Treatment tank 12 can be fabricated by welded construction using steel plate. Alternately, it has been found convenient to construct treatment tank 12 of fiberglass reinforced polyester formed in appropriate sections joined together by stainless steel bolts 30 as for example at flanges 31 and 33. An appropriate neoprene gasket 32 is interposed between tank flanges 31 and 33 to provide sealing. A vented cover 35 is provided for access to the tank interior. A manhole 38 is provided at the opposite end of the tank to house recirculation pump 39 and other mechanical equipment.

A transverse baffle 41 divides the tank into a primary or inlet chamber 25 and a mixing chamber 44. Preferably baffle 41 is secured in place between the tank flanges 31 and 33 connecting the left spherical end 27 to the cylindrical body of the tank 27. A central portion of baffle 41 is cut out and a foraminous screen 47 is inserted in the cut out. Screen 47 typically has a ¼ inch mesh size. Thus, primary chamber 25 and mixing chamber 44 are in direct hydraulic communication via screen 47. As will be explained in greater detail hereafter, screen 47 permits a circular return flow pattern between the adjacent chambers but prohibits the entry of large solid particles from the primary chamber 25 into the mixing chamber 44. It will be apparent that baffle 41 could also be constructed as a solid sheet having perforations at selected locations to establish hydraulic communication between the primary and the mixing chamber 25. The purpose of the perforations or screen is to allow complete mixing and air dispersion while maintaining the larger solids in the primary chamber where sludge and solid decomposition occurs.

Aerated return liquid, feed and purifying organisms are admitted into the primary chamber from the mixing chambers and are completely and intimately mixed with incoming sewage. This complete mix system results in a more uniform load on the tank and gives a more uniform oxygen demand. A substantial portion of the sludge in the primary chamber is decomposed and metabolized through engenous respiration. The screen 47 or perforated baffle prevents entry of the larger solids into the mixing zone. The semi-spherical or curved wall surface of the primary zone also prevents sludge or solid from settling so that solids remain in suspension until decomposed. With the tank of the present invention, a sludge removal system is generally not required.

Another transverse baffle 50 is interposed within the cylindrical tank to establish an outlet chamber 52 in the right-hand tank end. The upper horizontal edge of baffle 50 forms a weir 51 so that clear overflow from the mixing chamber is admitted into the outlet chamber 52. Effluent from outlet chamber 52 overflows from treatment tank 12 through discharge line 18 which communicates with chamber 52 at an intermediate elevation.

Figure 3:
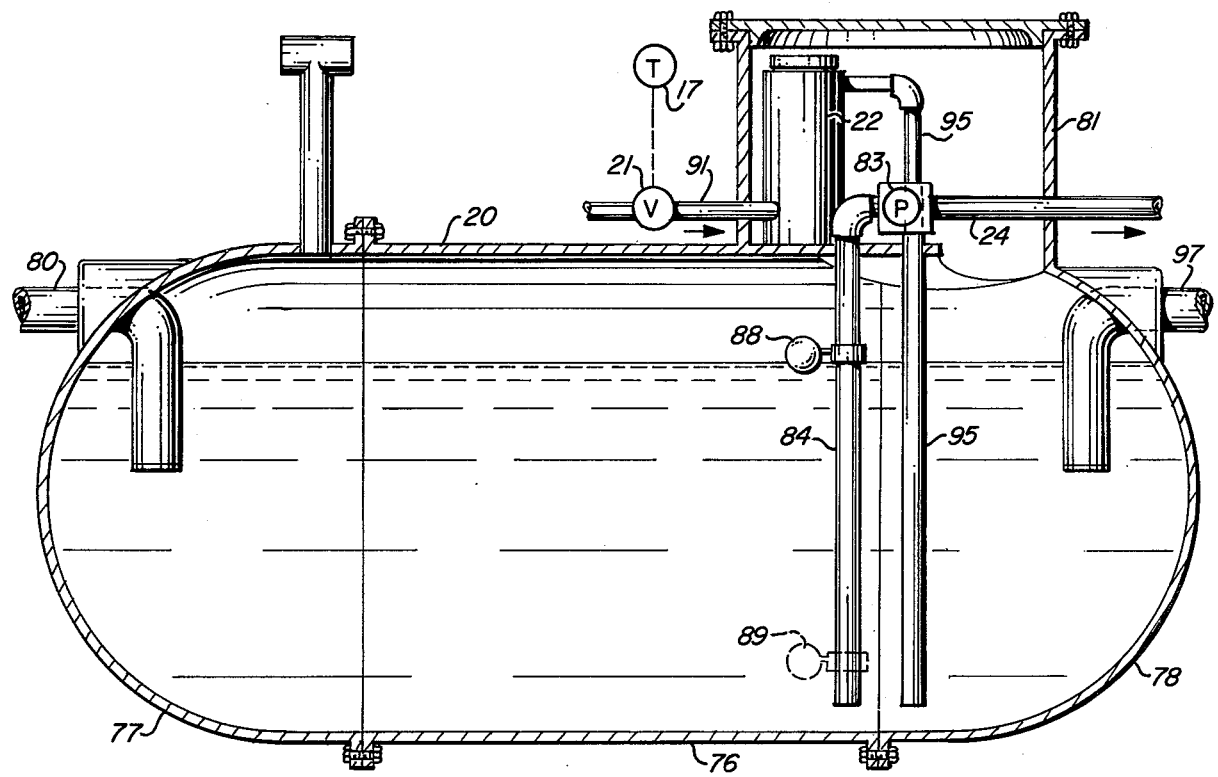
FIG. 3 is a longitudinal cross-sectional view showing the holding tank used in carrying out the present invention.
Figure 5:
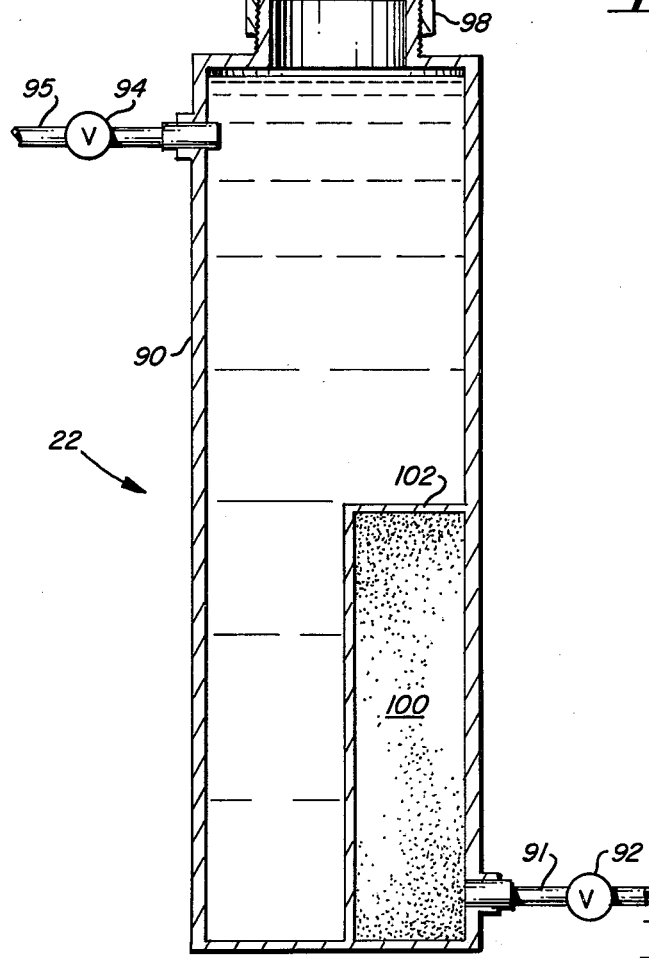
FIG. 5 is an elevational view, partly broken away, illustrating the chemical disinfectant unit.

The ejector 16 for entraining and mixing air in the recirculated liquid is best seen in FIGS. 2, 3 and 4. The inlet 58 of ejector 16 communicates with the discharge of recirculation pump 39. Pump 39 is connected at the inlet side to pipe 55 and withdraws from a location at an intermediate elevation in mixing chamber 44 adjacent outlet baffle 50. Ejector inlet 58 is preferably provided with internal pipe threads for convenient connection to pump 39. The discharge end 60 of ejector 16 is externally threaded and is connected to a discharge line 61. Discharge line 61 terminates near the bottom of mixing chamber 44. The lower end of discharge pipe 61 is provided with an elbow 62 which directs the discharge flow horizontally along the floor of the tank in a direction toward the primary chamber 42. Thus, it will be seen that the return mixed liquor, suspended solids and entrained air will be imparted a generally circular or oval flow pattern as shown in FIG. 2 due to the orientation of the discharge and the tank geometry. The flow pattern extends through baffle screen 47 into the primary chamber 25. The turbulence and the mixing action and the entrained air serve to rapidly metabolize sludge and microorganisms contained in the raw sewage. The semi-spherical tank end 27 will reversely deflect the flow pattern causing flow to return to the mixing chamber for further recirculation through the ejector.

The ejector has been found to be a highly efficient way of introducing large volumes of air into the contents of the tank and to maintain high solid concentration in suspension. The ejector converts the energy of pressure into energy of motion to entrain air and reconverts back to pressure at discharge. It has been found that greater oxygenation capacity per unit of horse power expended is achieved with the ejector of the present system.

The details of the ejector are best seen in FIG. 4. The axial flow passage through the ejector tapers or converges from inlet 58 at nozzle section 63 to throat portion 65. The nozzle 63 discharges across throat 65 into diffuser 67 which has a converging section 74, uniform diameter passage 66 and diverging section 68. Suction chamber 70 communicates with throat 65 and has angular surface 69 which extends rearwardly toward the inlet of the ejector. An air intake 72 communicates with the suction chamber 70. The air intake 72 and the suction chamber 70 have an axial length substantially greater than the throat opening 65. The size and configuration of the suction chamber permits substantial volumes of air to be turbulently arranged as the liquid is discharged by nozzle 63 across throat 65.

As is well known the chemical oxidation of organic impurities involves contacting the organic matter with air ($O_2$) resulting in the formation of sludge, gas and water. According to this basic equation of the biochemical reaction of the aerobic digestion system, the decomposable organic matter in sewage is transformed into gaseous products water and sludge or cell structures. As mentioned above, this process is called engenous respiration and available oxygen is of primary importance in the process. Therefore the injector of the present invention provides oxygen and results in the establishment of a constant maximum mixing action. Complete mixing occurs in both the mixing and primary chamber. The incoming raw sewage is diluted with recirculated liquid from the mixing chamber. As a result, a more uniform load is imposed on the system and a lower demand rate occurs than with traditional activated sludge systems. The tank geometry and the recirculation system cooperate to almost totally prevent accumulation of settled sludge or solids with otherwise would have to be removed from the system.

Effluent from the treatment tank is introduced into the holding and disinfection tank 20. The holding tank 20 is shown in detail in FIG. 3 and has a cylindrical body 76 and semi-spherical ends 77 and 78. Fabrication of this tank is substantially the same as that of the treatment tank and suitable materials may include steel and reinforced fiberglass. The effluent is admitted into the holding tank at inlet pipe 80. A manhole 81 houses the mechanical system associated with the holding tank. A discharge pump 83 withdraws treated disinfected effluent from the holding tank at intake line 84. Discharge line 24 carries treated effluent to a suitable location such as a stabilization pond from which the treated effluent may be used for non-domestic purposes. An overflow 97 is also provided. Conventional high and low level flow actuated controls 88 and 89 operate the motor associated with pump 83. Conventionally pump 83 is operable when the liquid level reaches the predetermined maximum level in the tank. The float control causes the pump to discontinue operation when the liquid level falls below a predetermined minimum. The low level float control also controls timer 17. Upon termination of the operation of pump 83 in response to a low level condition, timer 17 is energized, in turn, energizing the solenoid of valve 21 causing valve 21 in line 91 to remain open for a predetermined time during the disinfection cycle. Since such controls are well known and conventional, the details of these controls have been omitted for clarity.

Disinfection of the contents of holding tank 20 occurs by addition of a suitable disinfectant agent such as a selected halogen when the holding tank is at a low level. Chemical feed unit 22 consists of a chemical holding tank 90 which contains a suitable quantity of disinfectant 100 added interior chamber 102 through cover 98.

The preferred disinfectant is granular iodine which very rapidly and effectively kills bacteria, virus and fungus. An advantage of the use of iodine is that minimum contact time is required to kill bacteria. Tubing 91 connects the lower end of iodine tank 90 to pump 39. Valve 92 is interposed in the line 91. The outlet of tank 90 is connected to holding tank by means of discharge line 95 across valve 94.

Once the chemical feed unit has been installed as described above, a suitable disinfectant such as iodine crystals are added to tank 90. Valves 92 and 94 are adjustable to control pressure differential across the tank. A test can be conducted to determine the chemical residual in the tank and the valve adjusted to control the flow rate through the tank 90 and accordingly the rate of chemical feed. Chemical disinfection using the chemical feeder of the invention is highly effective and requires no electricity and involves no complex mechanical feeder mechanisms. The rate of application of disinfecting can be simply and easily controlled by adjustment of appropriate control valves.

For convenience of fabrication installation the treatment and holding tank have been shown as separate units interconnected by appropriate hydraulic piping. It will be apparent that the holding tank or chamber can be formed as an integral part of the treatment tank separated by an appropriate baffle within the tank. Such construction is within the scope of the present invention.

Because the apparatus of the present invention is modular, fabrication can be completed prior to shipment of the units to the plant site. Similarly, it is convenient to increase the capacity of an existing plant by simply adding additional treatment and holding tank units. In some instances, it is also possible to convert some existing septic tanks to the extended aeration system of the present invention by installing the appropriate mechanical equipment and tank internals as disclosed herein.

While the present invention has been thoroughly described, the following example is provided to specifically illustrate the construction and operation of a typical treatment plant according to the present invention. A pilot sewage treating plant for treating sewage from a mobile home park located on a 5 acre site was designed and installed. Disposal of the final effluent from the system was by tertiary treatment in effluent polishing ponds to be subsequently used for irrigation. The applicable Arizona State Health Department regulations required 250 GPD flow per trailer space for design purposes. Volume loading was 60 to 112 lbs. BOD per 1000 cubic feet of sewage. Sewage flow was estimated on the basis of 250 GPD/per trailer space × 29 spaces = 7,250 GPD. Three treatment tanks constructed in accordance with the present invention, and having a capacity each of 1,950 gallons were fabricated. Each of the treatment tanks had a diameter of 5 feet and an overall length of 14 feet 10 inches. The effluent from each of the treating tanks transferred to a single holding tank as described herein having a capacity of 1,650 gallons. The final effluent from the holding tank was discharged into effluent polishing and stabilization ponds. Baffling was installed in the treatment tanks to provide the primary mixing and discharge zones as described herein. Mixed liquor was recycled in the treatment tank by means of the ejector which also provided the total mixing action. A one horse power pump was used for recirculation and the ejector selected had a 1½ inch orifice. The ejector supplied 4.9 pounds of oxygen per hour. Chemical treatment to disinfect the treated effluent utilized addition of iodine crystals. Effluent samples taken from the pilot plant indicated that iodine was a strong and acceptable disinfection agent. The fecal coliform dropped from 510/100 ml. in the treatment tank to 172/100 ml. in the holding tank and the standard plate count was 1,420,000 organisms per ml. to 380,000 organisms per milliliter. Samples of the effluent from the holding tank were taken and resulted in the following:

|  | Holding Tank |
| --- | --- |
| pH | 7.68 |
| Total Solids | 871 mg/liter |
| DO (Dissolved Oxygen) | 6.83 mg. of DO/liter |
| BOD (Biochemical Oxygen Demand) | 14 mg BOD/liter |
| Fecal Coliform | 172/100 ml |
| Standard Plate Count | 380,000 organisms/ml. |

Therefore, it will be seen that the present invention provides a simple and highly efficient apparatus and method for treating sewage and waste water and results in a quality final effluent suitable for many non-domestic uses.

It will be obvious to those skilled in the art to make various changes and modifications to the invention described herein and to the extent that such variations, changes and modifications do not depart from the spirit and scope of the appended claims, they are intended to be encompassed therein.

I claim:

1. An extended aeration system for continuous treatment of sewage comprising:

a. a treatment tank having opposite first and second end walls, said first end wall being generally curved;
   b. a foraminous transverse baffle within said tank having opposite first and second sides;
   c. a primary chamber within said tank formed between said first tank wall and said first side of said foraminous baffle;
   d. a mixing chamber within said tank disposed adjacent said second side of said foraminous baffle and being in hydraulic communication with said primary chamber via said baffle;
   e. inlet means for delivering sewage to be treated and communicating with said primary chamber;
   f. pumping and aerating means including a conduit having ejector means located therein and having an inlet withdrawing liquid from said mixing chamber and an outlet discharging recirculated liquid in said mixing chamber towards said baffle and said curved end wall whereby a general circular flow pattern is established from the mixing chamber to the primary chamber across said baffle and return whereby larger solids are maintained in the primary chamber and are subject to substantially complete organic decomposition therein;
   g. discharge means for withdrawing treated effluent from the mixing chamber separate from said pumping and aerating means; and
   h. holding means for receiving the effluent of said treatment tank having means associated therewith for chemical disinfection of said effluent.

2. The system of claim 1 wherein said ejector means has a converging inlet nozzle which discharges into a diffuser section across a throat, said throat being in communication with a suction chamber having an axial dimension greater than said throat.

* * * * *